(12) United States Patent
Hansen et al.

(10) Patent No.: US 7,807,120 B2
(45) Date of Patent: Oct. 5, 2010

(54) HIGH-EFFICIENCY CATALYTIC CONVERTERS FOR TREATING EXHAUST GASES

(75) Inventors: Todd K. Hansen, Bainbridge Island, WA (US); David A. Endrigo, Keyport, WA (US)

(73) Assignee: in the works..., Bainbridge Island, WA (US)

( * ) Notice: Subject to any disclaimer, the term of this patent is extended or adjusted under 35 U.S.C. 154(b) by 0 days.

(21) Appl. No.: 12/344,413

(22) Filed: Dec. 26, 2008

(65) Prior Publication Data

US 2009/0175772 A1 Jul. 9, 2009

Related U.S. Application Data

(60) Provisional application No. 61/017,138, filed on Dec. 27, 2007.

(51) Int. Cl.
*B01D 53/92* (2006.01)
*B01D 53/94* (2006.01)
*F01N 3/10* (2006.01)
*F01N 3/28* (2006.01)

(52) U.S. Cl. ............... 423/210; 423/213.2; 423/DIG. 6; 422/168; 422/173; 422/180; 60/299; 60/300; 60/303

(58) Field of Classification Search ............... 423/213.2, 423/210, DIG. 6; 422/168, 173, 180; 60/299, 60/300, 303
See application file for complete search history.

(56) References Cited

U.S. PATENT DOCUMENTS

| | | | | |
|---|---|---|---|---|
| 1,522,111 A | * | 1/1925 | Axel | 422/169 |
| 1,605,484 A | * | 11/1926 | Thompson et al. | 423/213.5 |
| 3,025,132 A | * | 3/1962 | Innes | 423/213.2 |
| 3,169,836 A | * | 2/1965 | Davis | 422/171 |
| 3,598,540 A | * | 8/1971 | Chase | 422/177 |
| 3,674,441 A | * | 7/1972 | Cole | 422/109 |
| 3,874,854 A | * | 4/1975 | Hunter, Jr. | 422/175 |
| 3,957,447 A | * | 5/1976 | Hanaoka | 422/108 |
| 5,584,178 A | | 12/1996 | Naegeli et al. | |
| 5,771,682 A | | 6/1998 | Simons | |
| 5,987,885 A | | 11/1999 | Kizer et al. | |
| 6,016,654 A | | 1/2000 | Schatz | |
| 6,116,022 A | | 9/2000 | Woodward | |

(Continued)

OTHER PUBLICATIONS

International Search Report and Written Opinion; International Patent Application No. PCT/US08/88377; Filed: Dec. 26, 2008; Applicant: In the Works . . . ; Mailed on Mar. 9, 2009.

*Primary Examiner*—Timothy C Vanoy
(74) *Attorney, Agent, or Firm*—Perkins Coie LLP

(57) ABSTRACT

Several embodiments of high-efficiency catalytic converters and associated systems and methods are disclosed. In one embodiment, a catalytic converter for treating a flow of exhaust gas comprising a reaction chamber, a heating enclosure enclosing at least a portion of the reaction chamber, and an optional coolant channel encasing the heating enclosure. The reaction chamber can have a first end section through which the exhaust gas flows into the reaction chamber and a second end section from which the exhaust gas exits the reaction chamber. The heating enclosure is configured to contain heated gas along the exterior of the reaction chamber, and the optional coolant channel is configured to contain a flow of coolant around the heating enclosure. The catalytic converter can further include a catalytic element in the reaction chamber.

17 Claims, 9 Drawing Sheets

U.S. PATENT DOCUMENTS 6,530,215 B2   3/2003   Alkemade et al.
6,875,407 B1 *  4/2005   Biel et al. .................. 422/179
6,951,099 B2   10/2005   Dickau
2004/0096371 A1   5/2004   Haag

* cited by examiner

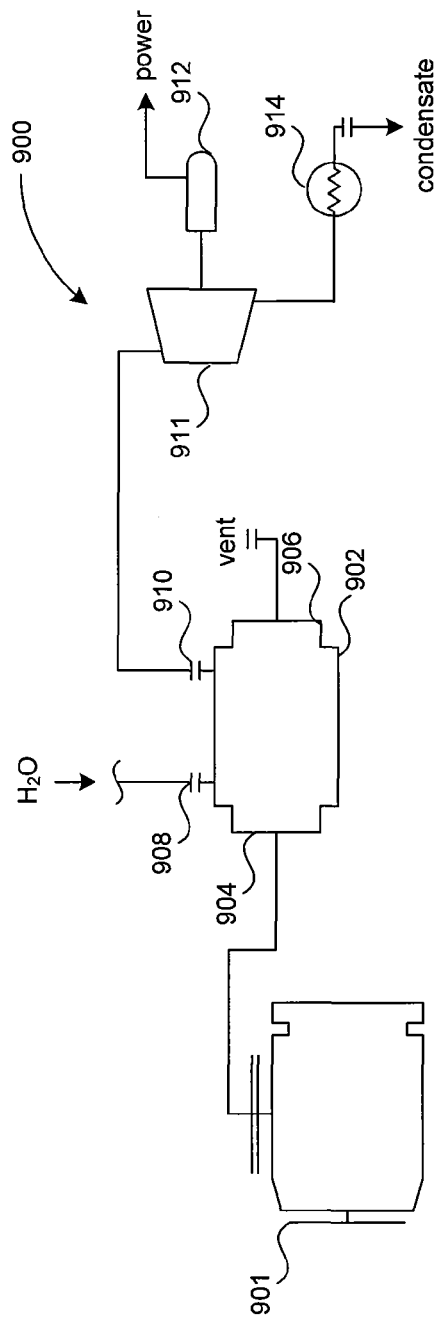
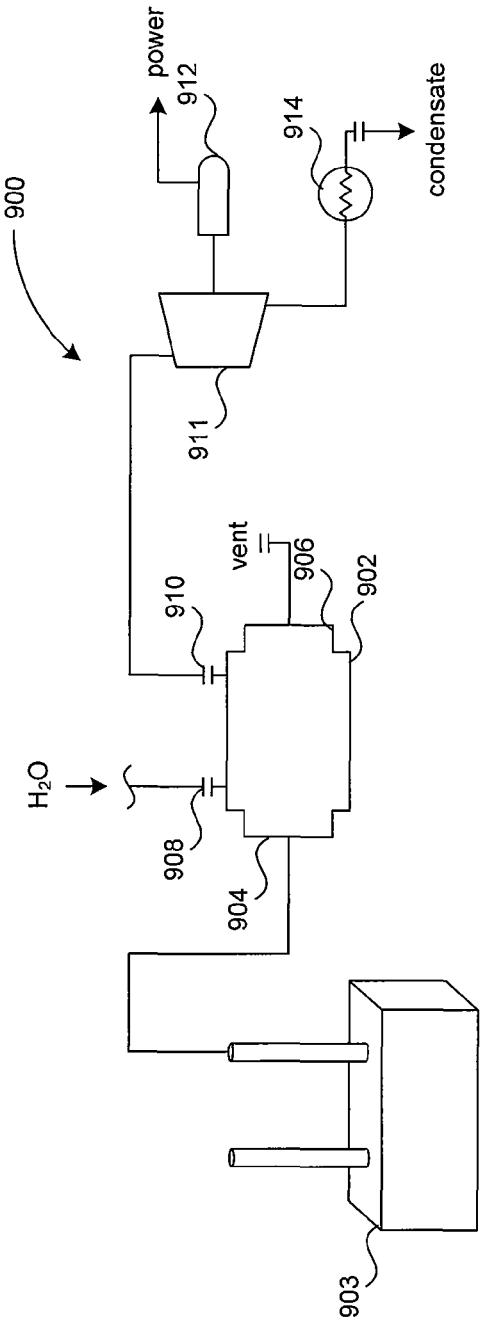

HIGH-EFFICIENCY CATALYTIC CONVERTERS FOR TREATING EXHAUST GASES

CROSS-REFERENCE TO RELATED APPLICATION(S)

The present application claims priority to U.S. Provisional Application No. 61/017,138, filed Dec. 27, 2007, the disclosure of which is incorporated herein in its entirety.

TECHNICAL FIELD

The technical field is related to catalytic converters for treating exhaust gases, such as exhaust gases from internal combustion engines, power generators (e.g., coal or fossil fuels), and other sources of exhaust gases.

BACKGROUND

Catalytic converters have been used to reduce emissions in exhaust gases of internal combustion engines for many years. For example, catalytic converters have been required for use in gas powered cars to remove hydrocarbons, nitrogen oxide, carbon monoxide, and other contaminants from exhaust gases. Catalytic converters have also been developed to provide auxiliary heat to the passenger compartments of hybrid cars. A typical catalytic converter includes a catalytic element, such as a catalytic core, contained in a housing. The catalytic element can be a monolithic catalyst with an open-pore structure having irregular and inter-connected flow paths for the exhaust gases, such as porous metal or ceramic materials, networks, or fiber structures. Other catalytic elements can have a honeycomb structure with regular flow channels through which the exhaust gases flow. The catalyst can be platinum, ruthenium, or another suitable catalyst that removes the undesirable elements from the exhaust gases. In general, the catalysts require a minimum temperature to react with the emissions, and higher reaction temperatures enhance the removal of emissions from the exhaust gases. Several conventional catalytic converters are relatively inefficient because the temperature at the center of the core is often much higher than at the periphery. As a result, the peripheral portions of the catalytic element typically have a lower reaction rate and lower efficiency that reduces the overall efficiency of the catalytic converter.

Although catalytic converters have been required in cars for many years, they have not been required in marine vessels with inboard or stern drive engines. However, in 2009, catalytic converters will also be required in new marine vessels with inboard or stern drive engines. This requirement is challenging because it has been difficult to maintain a sufficiently cooled exterior temperature for marine applications while also maintaining a sufficiently high temperature in the peripheral regions of the core to remove enough emissions to meet the standards of the Environmental Protection Agency (EPA). The core temperature of conventional catalytic converters is typically 1,000-1,400° F. In automobile applications the exterior surfaces of the catalytic converters are air cooled and have temperatures of about 600-1,000° F. Such high exterior temperatures significantly exceed the 200° F. exterior temperature limit set by the United States Coast Guard in its regulations for marine vessels. Catalytic converters for marine vessels are accordingly water cooled to reduce the exterior temperatures to within acceptable limits. Water cooling the exterior of the catalytic converters, however, further reduces the temperatures of the peripheral regions of the catalytic cores. Water cooled catalytic converters accordingly often have much lower efficiencies that result in higher hydrocarbon, nitrogen oxide, and carbon monoxide emissions.

One proposed solution for marine catalytic converters has a core contained in a housing, a solid insulating blanket of asbestos or other solid material around the core, and a water jacket around the insulating blanket. To offset the heat loss at the periphery of the core, marine catalytic converters may use more efficient and more expensive ruthenium catalytic elements. Although this solution is an improvement, it is still less efficient than catalytic converters for automobiles that use less expensive platinum catalytic cores. Moreover, although ruthenium or other core materials can be used to increase the efficiency, marine catalytic converters still may not meet the standards of the EPA.

Additionally, even though current catalytic converters reduce the emissions from cars and other sources, the sheer number of vehicles in operation have greatly contributed to the amount of hydrocarbons, nitrogen oxide, and carbon monoxide in the atmosphere. According to many studies and models, the rapidly increasing levels of hydrocarbons, nitrogen oxide, and carbon monoxide emissions are contributing to an unprecedented rate of global warming that will likely have many repercussions. The rapid increase in the average temperatures being reported have led many scientists to predict disastrous consequences unless emissions are reduced significantly. Therefore, providing a high-efficiency catalytic converter that removes more emissions from exhaust gases will protect the environment and mitigate the potential consequences of global warming.

BRIEF DESCRIPTION OF THE DRAWINGS

FIGS. 9A-B are schematic diagrams of power generating systems having a catalytic converter in accordance with embodiments of the disclosure.

DETAILED DESCRIPTION

A. Overview

Figure 1:
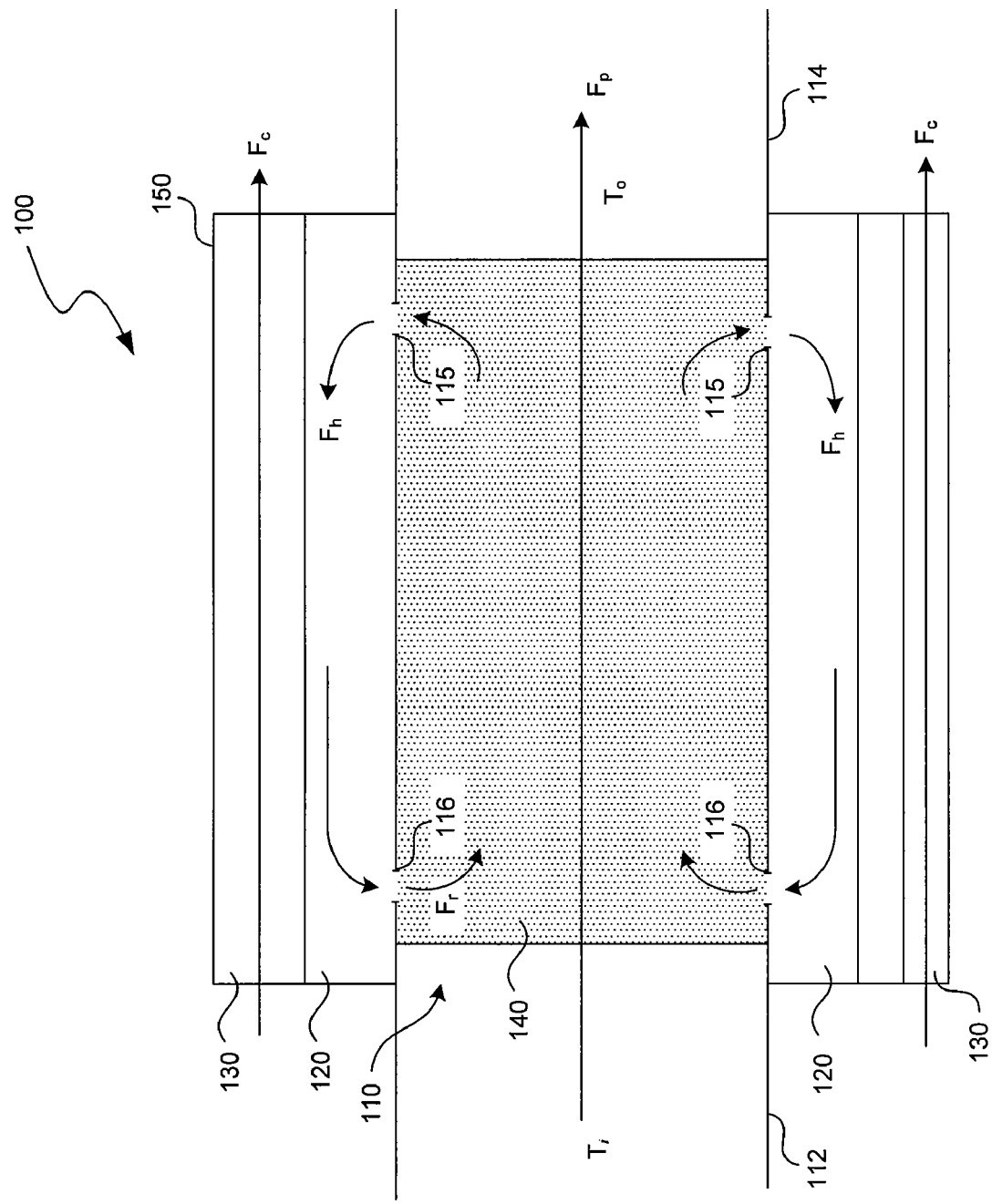
FIG. 1 is a schematic illustration of a high-efficiency catalytic converter in accordance with an embodiment of the disclosure.

The following disclosure describes several embodiments of catalytic converters in the context of marine vessels for use with inboard or stern drive internal combustion engines. For example, the described embodiments of the catalytic converters are well suited for use in pleasure craft (e.g., ski-boats, yachts, fishing boats, etc.) and personal water crafts (e.g., "jet-skis" and "water bikes"). Although the embodiments of catalytic converters described below are well suited for marine vessels, they can also be used in industrial, automotive, or other applications in which it is desirable to remove emissions from exhaust gases. Several embodiments of the catalytic converter may accordingly be used to remove hydrocarbons, nitrogen oxide, carbon monoxide, and other emissions from coal fired generators, other types of internal combustion engines used in marine or other applications, or other applications that can benefit from highly efficient removal of emissions from gases. Additionally, several other embodiments of the catalytic converter can have different configurations, components, or procedures than those described in this section. A person of ordinary skill in the art, therefore, will accordingly understand that the catalytic converter and associated gas treatment and/or power generating systems may have other embodiments with additional elements, or the invention may have other embodiments without several of the features shown and described below with reference to FIGS. 1-9B.

One embodiment of a catalytic converter for treating a flow of exhaust gas comprises a reaction chamber, a heating enclosure enclosing at least a portion of the reaction chamber, and an optional coolant channel encasing the heating enclosure. The reaction chamber can have a first end section through which the exhaust gas flows into the reaction chamber and a second end section from which the exhaust gas exits the reaction chamber. The heating enclosure is configured to contain heated gas along the exterior of the reaction chamber, and the optional coolant channel is configured to contain a flow of coolant around the heating enclosure. The catalytic converter can further include a catalytic element in the reaction chamber.

Another embodiment of a catalytic converter for treating a flow of exhaust gas comprises a reaction chamber having an inlet section and an outlet section configured such that a primary flow of the exhaust gas passes through the reaction chamber from the inlet section to the outlet section. The catalytic converter further includes a plenum surrounding the reaction chamber, a first passageway between the reaction chamber and the plenum at the outlet section, and a second passageway between the reaction chamber and the plenum at the inlet section. A portion of the primary flow of the exhaust gas passes through the plenum from the first port to the second port to generate a counter-flow of heated gas through the plenum. The catalytic converter can further include an optional coolant channel surrounding the plenum, and a catalytic core in the reaction chamber.

A method for reducing emissions from a flow of exhaust gas in accordance with one embodiment comprises passing a primary flow of exhaust gas in a first direction through a catalytic core in a reaction chamber and passing a secondary flow of exhaust gas through a heating enclosure around the reaction chamber. The method can further include passing a flow of cooling fluid through a coolant channel surrounding the heating enclosure. Several specific examples of the foregoing embodiments of catalytic converters, gas treatment systems, power generation systems, and associated methods for reducing emissions and/or generating power from a flow of exhaust gas are described below with reference to FIGS. 1-9B.

B. Description of Specific Embodiments of Catalytic Converters

FIG. 1 is a schematic illustration of a high-efficiency catalytic converter 100 that is well suited for applications that require limited external temperatures and/or higher efficiencies. In this embodiment, the catalytic converter 100 includes a reaction chamber 110, a heating enclosure 120 enclosing at least a portion of the reaction chamber 110, and a cooling channel 130 encasing at least a portion of the heating enclosure 120. The reaction chamber 110 has a first end section 112 through which a primary flow $F_p$ of exhaust gas flows into the reaction chamber 110 and a second end section 114 from which the primary flow $F_p$ of exhaust gas exits the reaction chamber 110. The first end section 112 can accordingly be an inlet section, and the second end section 114 can be an outlet section. The heating enclosure 120 can be a plenum configured to contain a flow of heated gas $F_h$ along the exterior of the reaction chamber 110, and the coolant channel 130 can be a cooling jacket configured to contain a coolant flow $F_c$ around the heating enclosure 120. In the embodiment illustrated in FIG. 1, the heating enclosure 120 is an interior annular plenum concentrically adjacent to a medial section of the reaction chamber 110, and the coolant channel 130 is an outer annular jacket concentrically adjacent to the heating enclosure 120. The catalytic converter 100 further includes a catalytic element 140 in the reaction chamber 110. Suitable catalytic elements 140 include an open-pore matrix, such as porous metals or ceramics, networks, or fiber structures, and a catalyst, such as platinum, ruthenium, or other suitable catalysts depending upon the type of exhaust gas. The catalytic element 140 can alternatively be a honeycomb matrix or other matrix structures with the desired catalyst(s). The reaction chamber 110, heating enclosure 120, and cooling channel 130 operate together to enhance the efficiency of the catalytic element 140 while also providing a much lower temperature at the exterior of the catalytic converter.

In this embodiment, the reaction chamber 110 further includes one or more first ports 115 toward the outlet section 114 and one or more second ports 116 toward the inlet section 112. The first ports 115 and the second ports 116 can operate together to generate a counter-flow $F_h$ of high temperature exhaust gas through the heating enclosure 120. The heated flow $F_h$ enters the heating enclosure 120 through the first ports 115 and exits from the heating enclosure 120 through the second ports 116 so that a recirculation flow $F_r$ enters back into the primary flow $F_p$ of exhaust gas. The counter-flow $F_h$ through the heating enclosure 120 is extremely hot because it enters the heating chamber 120 after it has been processed by the catalytic element 140. More specifically, the thermal reaction of the catalytic process heats the primary flow $F_p$ of exhaust gases from an inlet temperature $T_i$ of about 300-600° F. to an outlet temperature $T_o$ of about 1,000-1,400° F. As a result, the heated flow $F_h$ provides an extremely hot barrier with a low thermal conductivity between the catalytic element 140 in the reaction chamber 110 and the coolant flow $F_c$ in the coolant channel 130. The heated flow $F_h$ actively heats the exterior of the reaction chamber and accordingly mitigates heat loss from the reaction chamber 110 such that the peripheral regions of the catalytic element 140 also have a very high temperature that is near the central core temperature. In contrast to conventional water-cooled catalytic converters that do not actively heat the exterior of the reaction chamber, the catalytic converter 100 is highly efficient and removes a very significant percentage of carbon monoxide, nitrogen oxide, hydrocarbons and/or other undesirable constituents from the primary flow $F_p$ of exhaust gas.

The coolant channel 130 contains a sufficient flow of coolant, such as water or another suitable fluid, to cool an exterior surface 150 around the heating enclosure 120 and/or the end sections of the reaction chamber 110. When the catalytic converter 100 is used in marine applications for inboard or stern drive vessels, the coolant flow $F_c$ can be a flow of raw water from the body of water supporting the vessel or a closed-loop system incorporating a heat exchanger. The coolant flow $F_c$ removes the heat radially outwardly from the heating enclosure 120 such that the exterior surface 150 is within a suitable operating range for the particular application. In the case of marine vessels, the coolant flow $F_c$ is sufficient such that the temperature of the exterior surface 150 is less than 200° F., and generally less than about 160° F., during normal operation. For example, a specific prototype of the catalytic converter 100 tested in 45-60° F. ambient water has an exterior surface temperature of 80-120° F. and a core temperature in the catalytic element 140 of about 1,100-1,400° F.

Figure 2:
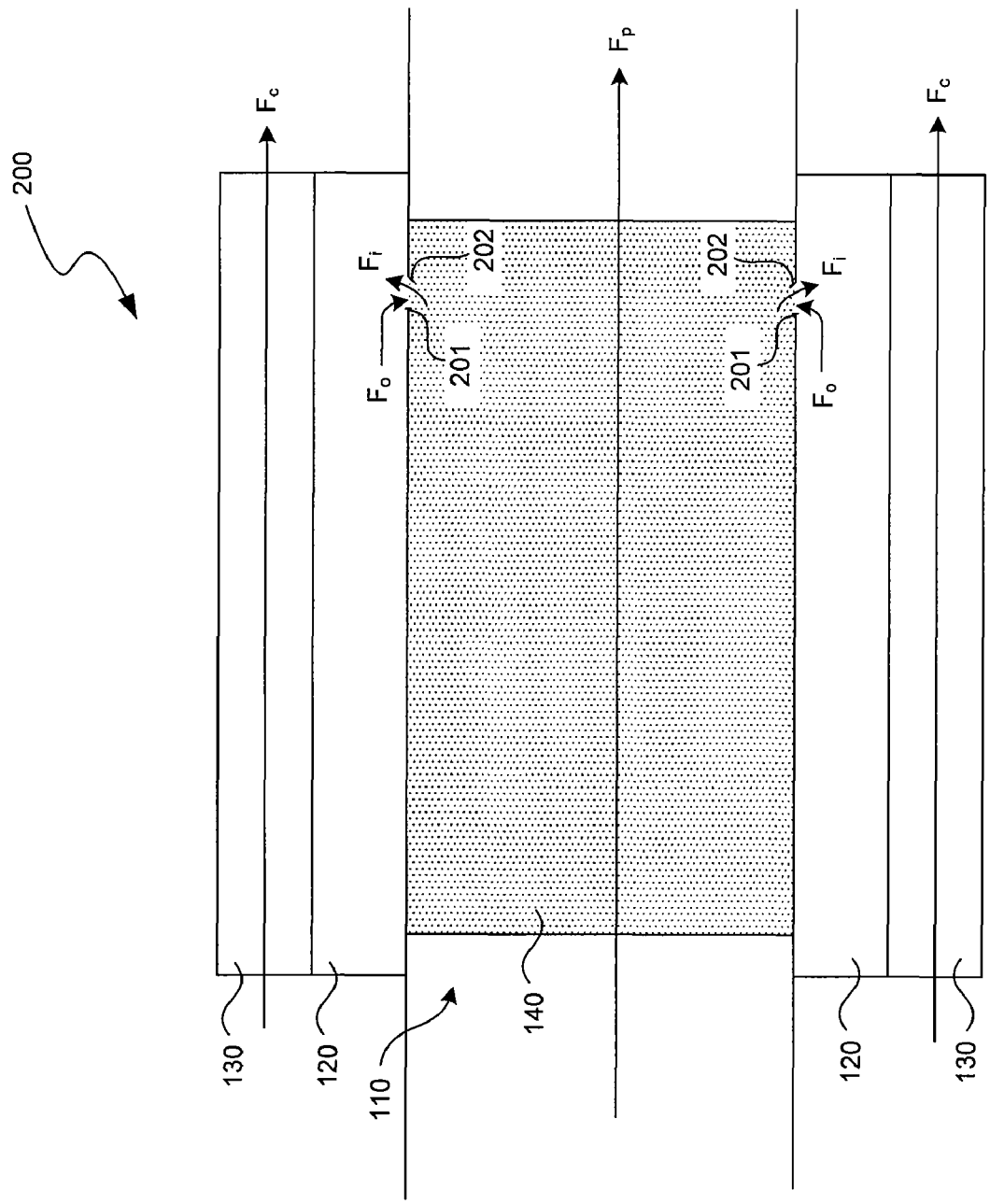
FIG. 2 is a schematic view of a catalytic converter in accordance with another embodiment of the disclosure.

FIG. 2 is a schematic view of a catalytic converter 200 in accordance with another embodiment of the disclosure. Like reference symbols refer to like components in FIGS. 1 and 2. In this embodiment, the reaction chamber 110 of the catalytic converter 200 includes one or more ports 201 through which the exhaust gases flow both in and out of the heating enclosure 120. The ports 201 can have a scoop 202 that directs an in-flow $F_i$ from the primary flow $F_p$ into the heating enclosure 120. An outflow $F_o$ from the heating enclosure also occurs through the port 201. More specifically, when the pressure in the heating enclosure 120 exceeds the pressure at the ports 201, the outflow $F_o$ will pass through the ports 201. The catalytic converter 200 is similar to the catalytic converter 100, but the catalytic converter 200 does not produce the same counter flow through the heating enclosure 120.

Figure 3:
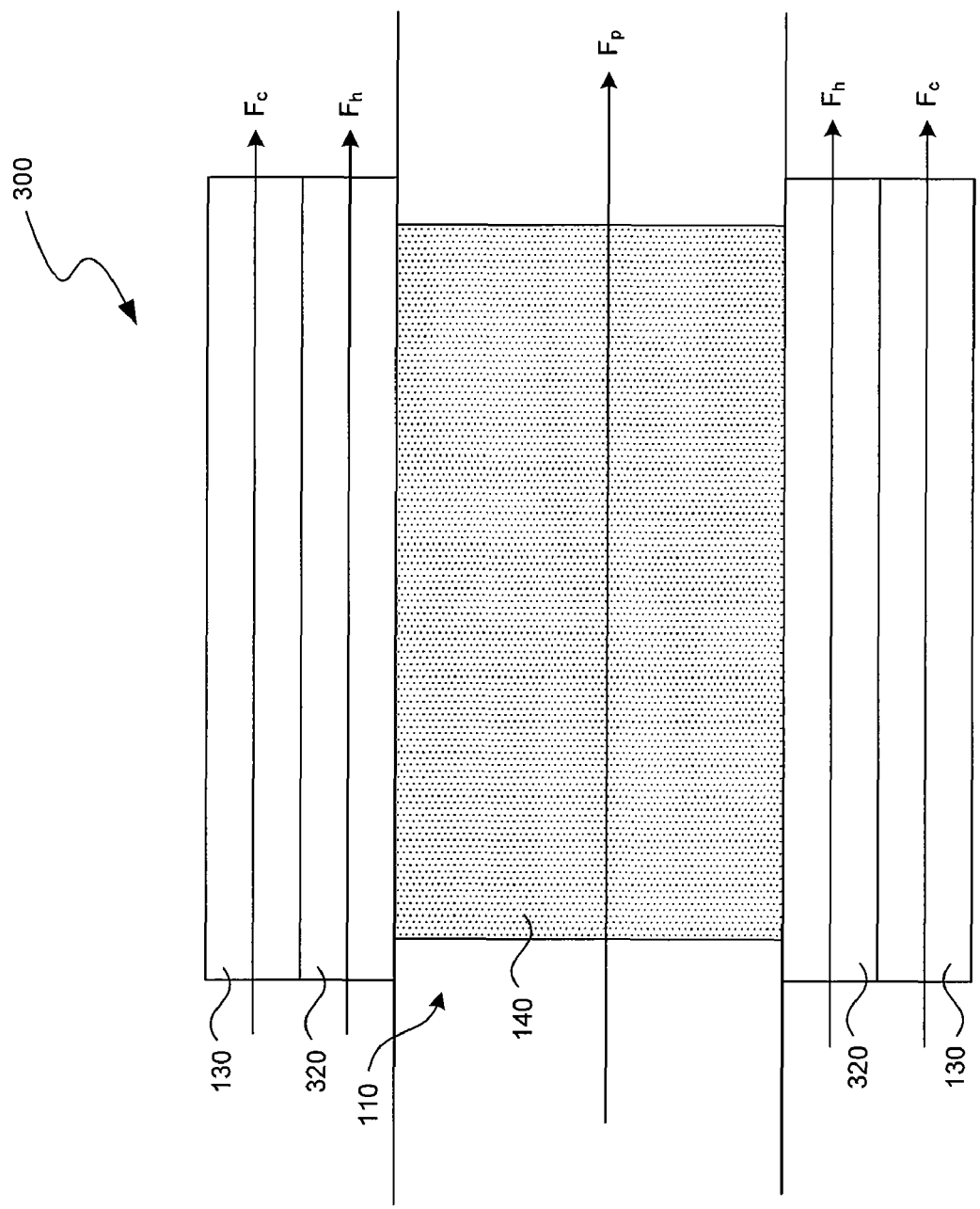
FIG. 3 is a schematic view of a catalytic converter in accordance with yet another embodiment of the disclosure.

FIG. 3 is a schematic view of a catalytic converter 300 in accordance with yet another embodiment of the disclosure, and like reference symbols refer to like components in FIGS. 1-3. The catalytic converter 300 has a heating channel or enclosure 320 that is completely distinct from the reaction chamber 110. In this embodiment, the heated flow $F_h$ can comprise exhaust gases removed from the primary flow $F_p$ upstream from the catalytic converter 300 and then reintroduced to the primary flow $F_p$ downstream from the catalytic converter 300. As such, the heated flow $F_h$ through the heating enclosure 320 is not processed through the catalytic element 140. The heated flow $F_h$ in the catalytic converter 300, therefore, is not as hot as the heated flow $F_h$ in the catalytic converter 100. In another example of this embodiment, the heated flow $F_h$ can be raw air that is passed over the exterior of the exhaust manifold, the exterior of the exhaust pipe, or other heated portions of the engine to reach a reasonably high temperature that still mitigates heat transfer away from the reaction chamber 110.

Figure 4:
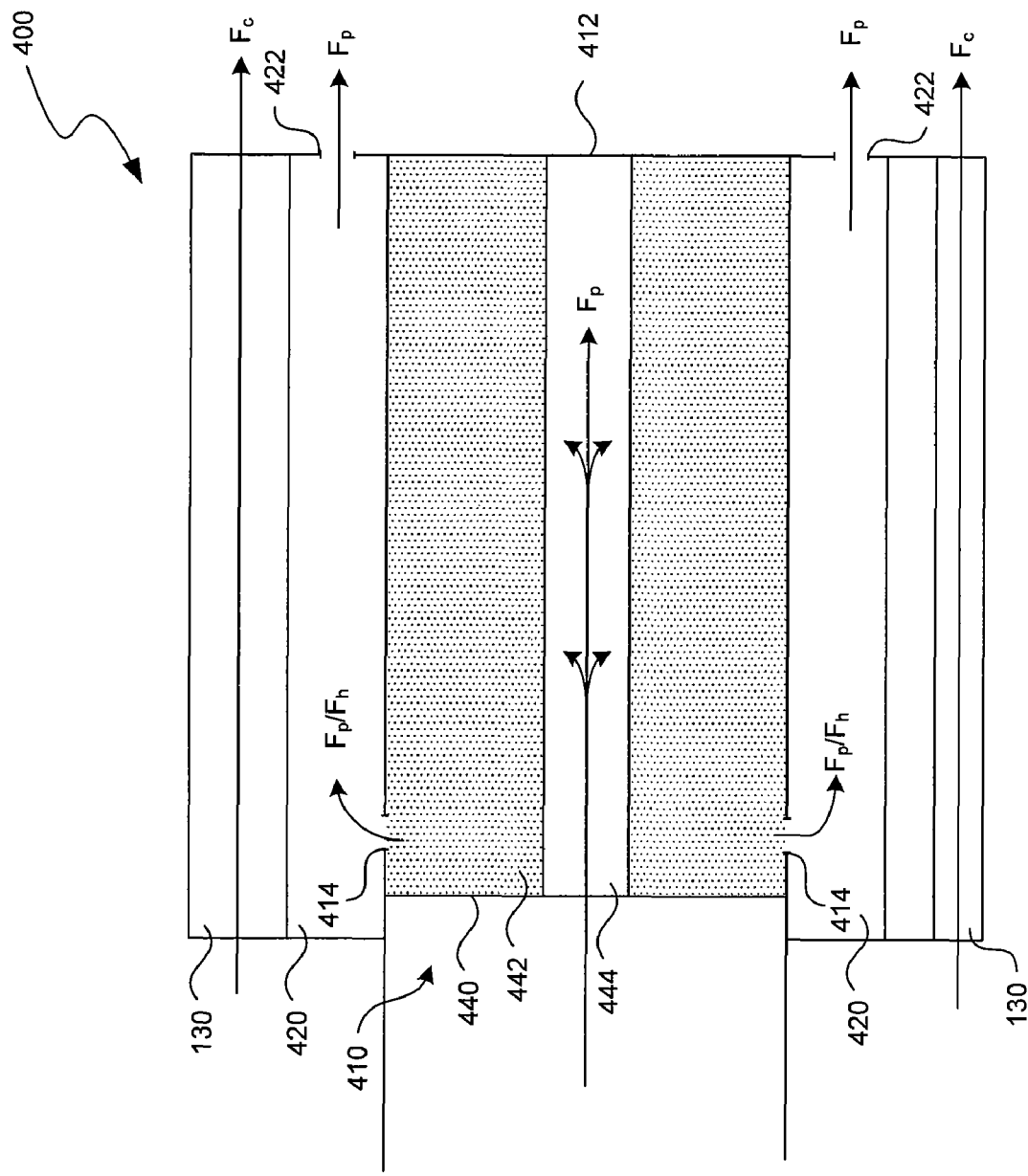
FIG. 4 is a schematic view of a catalytic converter in accordance with still another embodiment of the disclosure.

FIG. 4 is a schematic view of a catalytic converter 400 in accordance with another embodiment of the disclosure, and like reference numbers refer to like components throughout FIGS. 1-4. In this embodiment, the catalytic converter 400 includes a reaction chamber 410 having a closed end 412 and a plurality of outlet ports 414. The catalytic converter 400 further includes a heating enclosure 420 around the reaction chamber 410 that includes a plurality of outlets 422, and a catalytic element 440 in the reaction chamber 410. In this embodiment, the catalytic element 440 has a matrix 442 that carries the catalyst and a central bore 444 through the matrix 442. The coolant channel 130 surrounds the heating enclosure 420 as explained above. In operation, the primary flow $F_p$ flows in through the central bore 444 and then through the matrix 442 of the catalytic element 440. The primary flow $F_p$ exits the reaction chamber 410 through the outlets 414 such that the heated flow $F_h$ in the heating enclosure 420 is the treated portion of the primary flow $F_p$ exiting the reaction chamber 410. The primary flow $F_p$ then exits the heating enclosure 420 through the outlet ports 422 and is directed out of the vessel. The catalytic converter 400 accordingly uses the catalytic element 440 to heat the exhaust gas in the heating enclosure 420.

Figure 5:
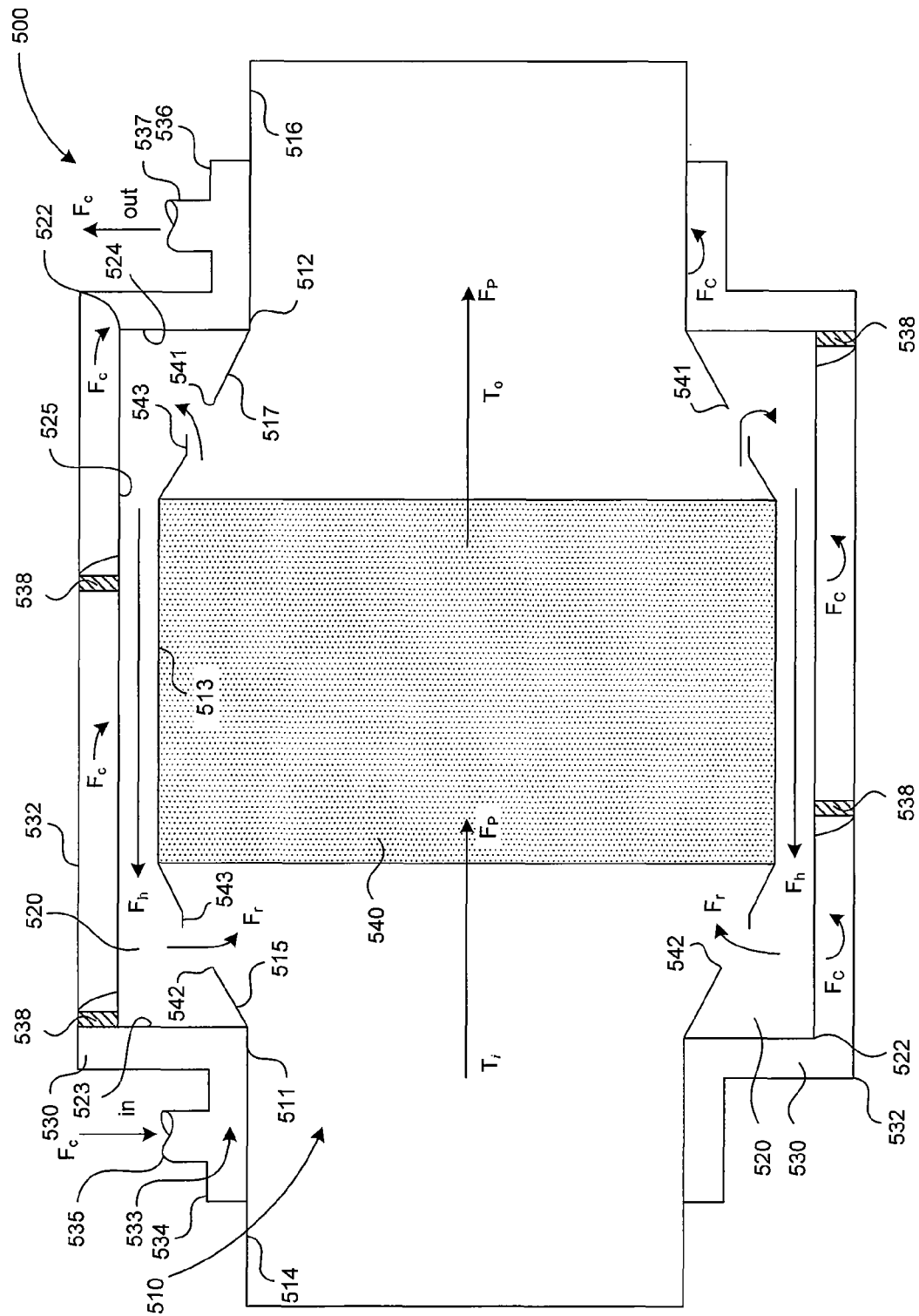
FIG. 5 is a cross-sectional view of a catalytic converter in accordance with another embodiment of the disclosure.

FIG. 5 is a cross-sectional view of a catalytic converter 500 in accordance with another embodiment of the disclosure. In this embodiment, the catalytic converter 500 includes a reaction chamber 510, a heating enclosure 520 around at least a portion of the reaction chamber 510, and a coolant channel 530 around the heating enclosure 520 and portions of the reaction chamber 510. The heating enclosure 520 is a plenum, and the coolant channel 530 is a jacket for containing a flow of coolant (e.g., water or another suitable liquid). In this embodiment, the catalytic element 540 has a matrix and a suitable catalyst as explained above.

The reaction chamber 510 includes a first end section 511, a second end section 512, and a central conduit 513 between the first end section 511 and the second end section 512 in which the catalytic element 540 is positioned. The first end section 511 includes a main inlet 514 through which the primary flow $F_p$ of exhaust gas enters the reaction chamber 510. The first end section 511 further includes a diverging wall 515 that has an increasing cross-sectional dimension from the end of the main inlet 514 to the central conduit 513. The second end section 512 has a main outlet 516 through which the primary flow $F_p$ of exhaust gas exits the reaction chamber 510. The second end section 512 further includes a converging wall 517 with a decreasing cross-sectional dimension in a direction away from the central conduit 513 toward the main outlet 516. As explained below, the configuration of the diverging wall 515 and converging wall 517 contribute to generating a consistent heated counter-flow $F_h$ through the heating enclosure 520. For example, without being bound by theory, the diverging wall 515 is believed to contribute to creating an expansion zone upstream from the catalytic element 540, and the converging wall 517 is believed to contribute to creating a high pressure zone downstream from the catalytic element 540.

The heating enclosure 520 has an inner housing 522 with a first portion 523 attached to the first end section 511 of the reaction chamber 510, a second portion 524 attached to the second end section 512 of the reaction chamber 510, and a medial portion 525 between the first portion 523 and the second portion 524. The medial portion 525 is spaced outwardly apart from the central conduit 513 of the reaction chamber 510 such that the heating enclosure 520 comprises an enclosed space between the inner housing 522 and the combination of exterior surfaces of the diverging wall 515, central conduit 513 and converging wall 517. The catalytic converter 500 in this embodiment also includes a plurality of first ports 541 through the converging wall 517 and a plurality of second ports 542 through the diverging wall 515. The first ports 541 and the second ports 542 can further include flaps 543 that extend into the heating enclosure 520.

The reaction chamber 510, the heating enclosure 520, and the catalytic element 540 operate together to generate a consistent counter flow of hot gases around the exterior of the central conduit 513 of the reaction chamber 510 to mitigate heat losses that would otherwise reduce the efficiency of the catalytic element 540. More specifically, the converging wall 517 and the flaps cause a portion of the exhaust gases from the primary flow $F_p$ to flow through the first ports 541 and into the heating enclosure 520. Conversely, the diverging wall 515 upstream from the catalytic element 540 and the flaps cause the gases to flow out of the heating enclosure 520 such that a heated counter-flow $F_h$ flows through the heating enclosure 520 in a direction opposite that of the primary flow $F_p$ through the reaction chamber 510. The heated counter-flow $F_h$ is particularly advantageous because the catalytic element 540 heats the exhaust gases from a temperature of approximately 300-600° F. at the first end section 511 to approximately 1,000-1,400° F. at the second end section 512. As a result, the gases entering the heating enclosure 520 are near the temperature of the catalytic element 540 itself. This high temperature gas flow through the heating enclosure 520 accordingly mitigates heat losses at the periphery of the catalytic element 540 so that the temperature gradient from the center of the catalytic element 540 to its periphery is relatively low. Additionally, because the heated counter-flow $F_h$ of gasses through the heating enclosure 520 is introduced as a recirculation flow $F_r$ upstream from the catalytic element 540, this portion of the exhaust gasses is reprocessed through the catalytic element 540 to further reduce the level of emissions in the primary flow $F_p$ that exits through the main outlet 516 of second end section 512.

The coolant channel 530 can include an outer housing 532 spaced apart from an exterior surface of the inner housing 522 and a flow channel 533 defined, at least in part, by the space between the inner housing 522 and the outer housing 532. In this embodiment, the outer housing 532 has a first end 534 with an inlet 535 and a second end 536 with an inlet 537. The first end 534 can surround a portion of the first end section 511 of the reaction chamber 510 upstream from the first portion 523 of the heating enclosure 520, and the second end 536 can surround a portion of the second end section 512 of the reaction chamber 510 downstream from the second portion 524 of the heating enclosure 520. This configuration of the coolant channel 530 accordingly cools the catalytic converter 500 both upstream and downstream from the very hot heating enclosure 520 to ensure that the exterior temperature of the catalytic converter 500 is low enough for marine applications. In other applications, however, it may not be necessary to have a low exterior temperature such that the coolant channel 530 does not necessarily need to extend over the reaction chamber 510 outside of the heating enclosure 520.

The flow channel 533 can further include a flow guide 538 that guides and/or divides the flow through the flow channel 533 to distribute the cooling fluid around the heating enclosure 520. In this embodiment, the flow guide 538 is a continuous, helical wall between the inner housing 522 and the outer housing 532 that creates a helical channel along the exterior surface of the heating enclosure 520. The coolant flow $F_c$ accordingly enters the inlet 535 and flows helically around the exterior of the heating enclosure 520 until it exits the coolant channel 530 at the outlet 537. The flow guide 538 is configured to distribute the coolant flow $F_c$ around the exterior surface of the heating enclosure 520 so that air pockets are less likely to form in the coolant channel 530 and/or the flow over the heating enclosure 520 is generally consistent. The flow guide 538 accordingly reduces the temperature gradients from one portion of the heating enclosure 520 to another. The flow guide 538 is optional depending upon the particular application. Additionally, in other embodiments, the flow guide 538 can be a plurality of individual walls extending lengthwise longitudinally along the length, or at least a portion of the length, of the flow channel 533.

Figure 6:
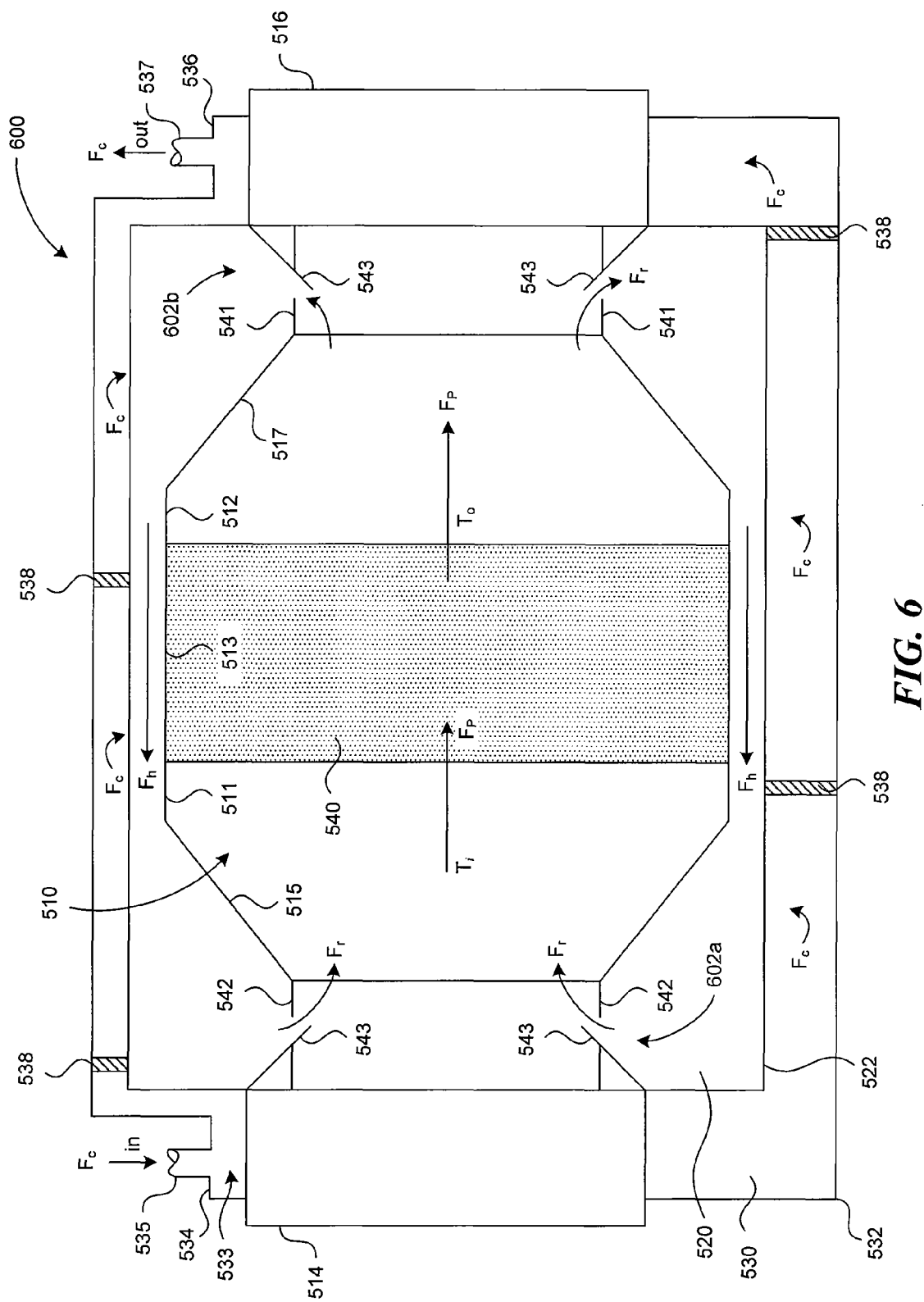
FIG. 6 is a cross-sectional view of a catalytic converter in accordance with yet another embodiment of the disclosure.
Figure 7:
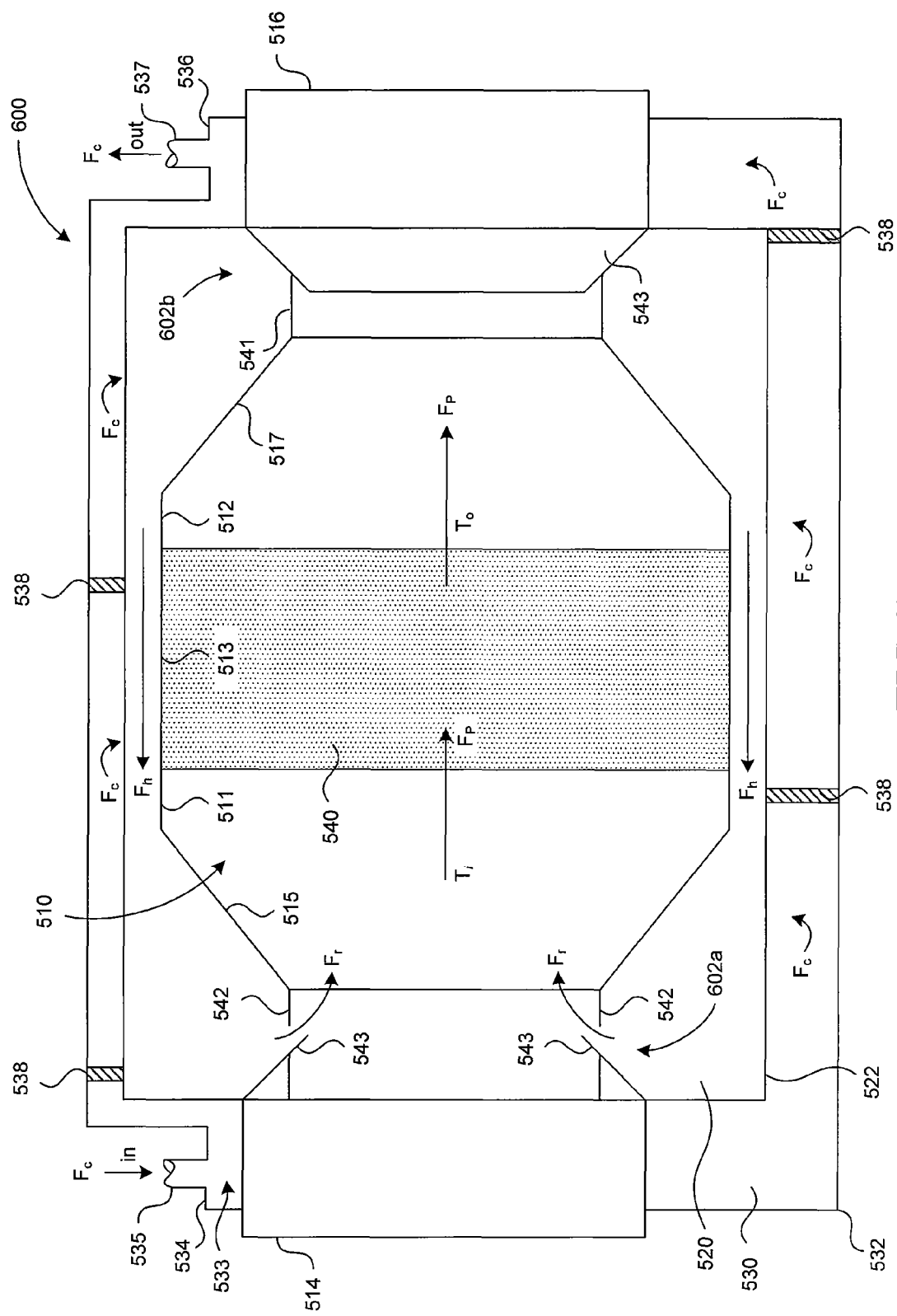
FIG. 7 is a cross-sectional view of an alternative embodiment of the catalytic converter of FIG. 6 in accordance with another embodiment of the disclosure.

FIG. 6 is a schematic view of a catalytic converter 600 in accordance with another embodiment of the disclosure, and FIG. 7 is a schematic view of an alternative arrangement of the catalytic converter 600 in FIG. 6. Like reference symbols refer to like components in FIGS. 5-7. In this embodiment, the reaction chamber 510 of the catalytic converter 600 can include features generally similar to the catalytic converter 500 shown in FIG. 5. However, as shown in FIG. 6, instead of having the first ports 541 through the converging wall 517 and a plurality of second ports 542 through the diverging wall 515, the catalytic converter 600 includes a first collar 602a having the first ports 541 and a second collar 602b having the second ports 542. The first and second collars 602a and 602b can carry the flaps 543 of the first and the second ports 541 and 542, respectively. The first and second collars 602a and 602b can have a generally ring shape, a rectangular shape, and/or other suitable shapes.

Even though the catalytic converter 600 is shown in FIG. 6 as having the flaps 543 of the first ports 541 generally aligned with those of the second ports 542, in other embodiments, the flaps 543 of the first ports 541 and those of the second ports 542 may be offset from one another. For example, as shown in FIG. 7, the flaps 543 of the first ports 541 can be offset from those of the second ports 542 by about 90°. In other examples, the flaps 543 of the first ports 541 can be offset from those of the second ports 542 by about 10°, 20°, 30°, 45°, and/or other suitable offset angles. The offset flaps 543 of the first and second ports 541 and 542 may help to reduce bypass of the heated counter-flow $F_h$ of gasses through the heating enclosure 520 and the recirculation flow $F_r$ through the reaction chamber 510.

In FIGS. 6 and 7, several embodiments of the catalytic converter 600 are shown to have the first and second collars 602a and 602b. In other embodiments, one of the first and second collars 602a and 602b may be omitted. In further embodiments, the catalytic converter 600 may include at least one of the first and second collars 602a and 602b that individually having a single flap 543, three flaps 543, or any other desired number of flaps 543. In yet further embodiments, at least one of the first and second collars 602a may include a flap (not shown) with a completely circular opening.

Figure 8:
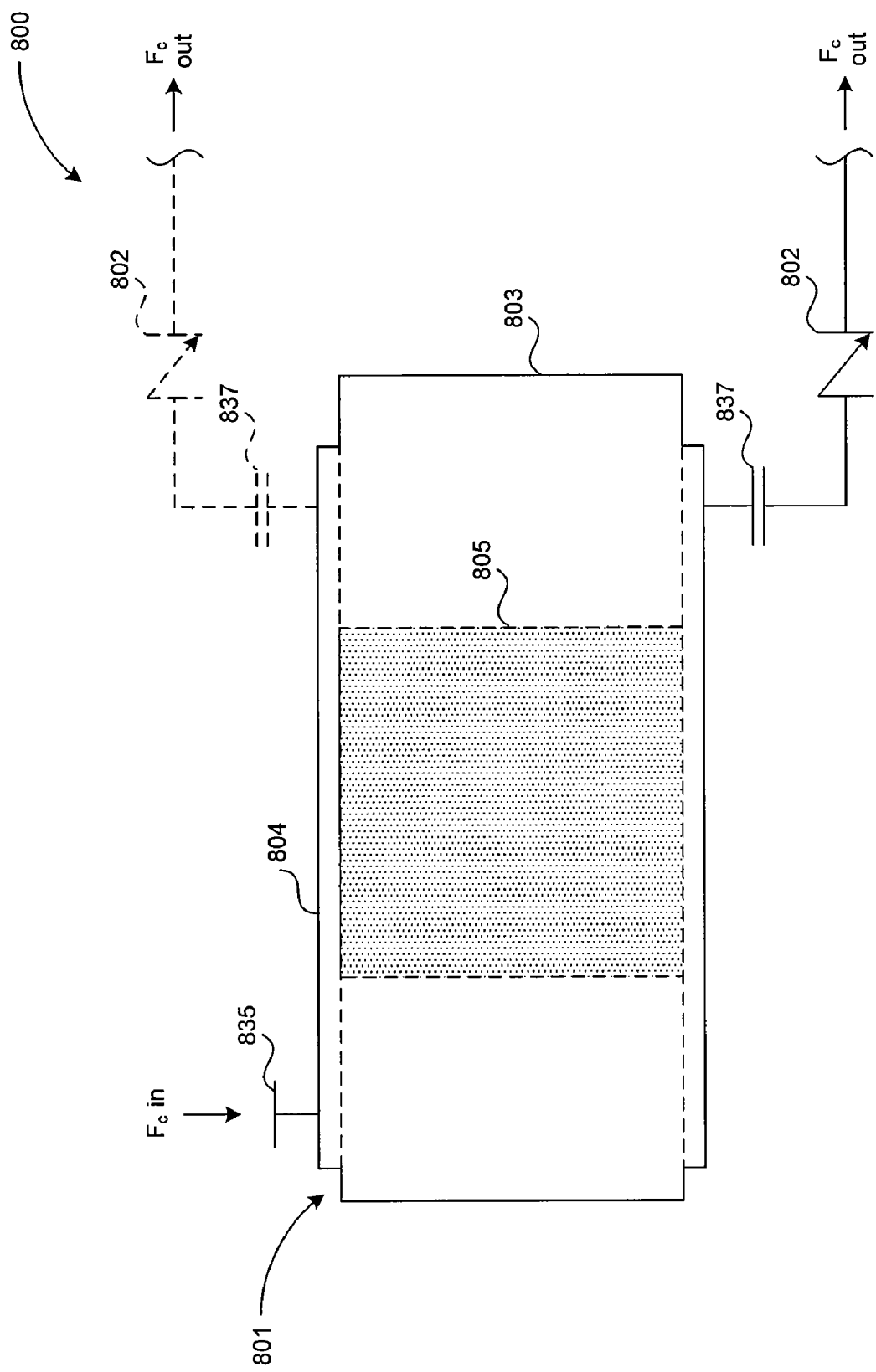
FIG. 8 is a schematic diagram of a gas treatment system having a catalytic converter in accordance with another embodiment of the disclosure.

FIG. 8 is a schematic diagram of a gas treatment system 800 in accordance with another embodiment of the disclosure. As shown in FIG. 8, the gas treatment system 800 can include a catalytic converter 801 coupled to a flow restrictor 802 downstream from the catalytic converter 801. The catalytic converter 801 can include a reaction chamber 803 carrying a catalytic element 805 and a cooling channel 804 surrounding the reaction chamber 803. The cooling channel 804 can have a coolant inlet 835 and a coolant outlet 837. In certain embodiments, the catalytic converter 801 can be generally similar in structure and function as several embodiments of the catalytic converter described above with reference to FIGS. 1-7. In other embodiments, the catalytic converter 801 can also have other configurations and/or features. For example, the catalytic converter 801 can be generally similar to the catalytic converter 100 in FIG. 1 except the catalytic converter 800 does not include the heating enclosure 120.

In the illustrated embodiment, the flow restrictor 802 includes a check valve in fluid communication with the coolant outlet 837 of the cooling channel 804. In other embodiments, the flow restrictor 802 can also include an orifice, a venturi, a nozzle, and/or other types of flow element suitable for at least reducing a coolant flow from the catalytic converter 801 or increasing a pressure drop of the coolant flowing through the cooling channel 804.

Several embodiments of the gas treatment system 800 can at least reduce the risk of overheating the catalytic converter 801 when a supply pressure of the coolant is insufficient. For example, in certain embodiments, the gas treatment system 800 may be used in a marine vessel that has an on-board water supply. When in water, the on-board water supply can provide sufficient pressure to force water through the cooling channel 804 of the catalytic converter 801. When the marine vessel is on land (e.g., towed on a trailer), the water in the catalytic converter 801 tends to drain out from the cooling channel 804 via the coolant outlet 837. Without the water, the catalytic element 805 may overheat and fail because the catalytic reaction may still be active due to residual gases in the reaction chamber 803 and/or the thermal inertia of the catalytic element 805. Accordingly, by incorporating the flow restrictor 802, at least some water would remain when the marine vessel is out of the water to at least reduce the risk of overheating the catalytic converter 801.

Even though the coolant outlet 837 is shown in FIG. 8 is at a bottom portion of the catalytic converter 801, in other embodiments, the coolant outlet 837 may be at a top portion of the catalytic converter 801, as shown in phantom lines in FIG. 8. In further embodiment, the catalytic converter 801 may include both a first coolant outlet (not shown) at a top portion and a second coolant outlet (not shown) at a bottom portion of the catalytic converter 801. At least one flow restrictor 802 may be in fluid communication with the first and second coolant outlets.

FIGS. 9A-B are schematic diagrams of a power generating system 900 in accordance with embodiments of the disclosure. As shown in FIG. 9A, the power generating system 900 can include an engine 901, a catalytic converter 902, a steam turbine 911, and an optional heat exchanger 914 interconnected with one another. The engine 901 can include a gasoline engine, a diesel engine, a gas turbine, and/or other gas-burning equipment. Alternatively, as shown in FIG. 9B, the power generating system 900 can include an industrial gas source 903 (e.g., a power plant, a synthetic gas reactor, etc.) instead of the engine 901. In further embodiments, the power generating system 900 may include a combination of at least one engine 901 and industrial gas source 903.

As shown in FIG. 9A, the catalytic converter 902 can include a gas inlet 904 coupled to the engine 901 and a gas outlet 906 open to vent. The catalytic converter 902 can also include a fluid inlet 908 and a fluid outlet 910. The fluid outlet 910 can be coupled to the steam turbine 911. In certain embodiments, the catalytic converter 902 can be generally similar in structure and function as several embodiments of the catalytic converter described above with reference to FIGS. 1-7. In other embodiments, the catalytic converter 902 can also have other configurations and/or features. In the illustrated embodiment, the steam turbine 911 can be coupled to an electrical generator 912. In other embodiments, the steam turbine 911 can also be coupled to a gas compressor, a pump, a drive shaft, and/or other suitable power equipment.

In operation, the engine 901 produces an exhaust gas with impurities (e.g., carbon monoxide, nitrogen oxides, etc.). The catalytic converter 902 receives the exhaust gas and reacts the impurities with air, oxygen, and/or other suitable composition to produce heat. The catalytic converter 902 then receives a fluid (e.g., water) at the fluid inlet 908 and raises the energy content of the fluid with the produced heat from reacting the impurities. In the illustrated embodiment, the catalytic converter 902 converts the received fluid (e.g., water) into steam and supplies the steam to the steam turbine 911, which drives the electrical generator 912 for producing electricity. The optional heat exchanger 914 can then condense and/or cool the steam and/or condensate from the steam turbine 911. The condensate may be returned to the catalytic converter 902, discharged to drain, and/or otherwise disposed of.

A specific embodiment of the catalytic converter 500 was tested in an in-board marine vessel using a raw water flow through the coolant channel 530. The raw water had a temperature of approximately 45-60° F. The catalytic element 540 exhibited a small temperature drop from the center of the core to the peripheral regions such that the temperature of the core from the center to the perimeter was approximately 1100-1400° F. at operating speeds. The temperature at the exterior surface of the coolant channel 530, however, was generally in the range of 70-120° F., and generally less than 100° F. even at high operating speeds. The catalytic converter removed a significant percentage of hydrocarbons (HC), nitrogen oxides (NOx), and carbon monoxide (CO). The extremely low emissions from the catalytic converter 500 were a significant improvement over conventional water cooled catalytic converters and an even more surprising improvement over existing air-cooled catalytic converters used in cars. More specifically, the emissions tests for an embodiment of the catalytic converter 500 used on a Ramjet EFI, 6.3 L, 530 hp engine, are set forth in Table 1 below.

| 2600 rpm Stabilized readings | | |
| --- | --- | --- |
| Stabilized Velocity (GPS) 26 mph | | Units |
| HC | 34 | ppm |
| CO | 0.01 | % |
| CO2 | 13.7 | % |

The catalytic converter 500 also provided significant noise abatement compared to systems without the catalytic converter. Without being bound by a theory, the heating enclosure 520 and coolant channel 530 appear to significantly dissipate acoustic energy in a manner that reduces the decibel level of the primary flow of $F_p$ of exhaust downstream from the catalytic converter 500. As a result, the catalytic converter 500 is further useful in marine applications and other applications in which noise pollution is a factor.

A specific embodiment of the catalytic converter 500 was further tested in an in-board marine vessel using a raw water flow through the coolant channel 530 under various engine conditions. An atmospheric analyzer provided by Speedtech (Model No. SM-28) was used to measure wind speed (both high and low), relative humidity, air temperature, and barometric pressure, as listed below:

| | | |
| --- | --- | --- |
| Wind Speed - high | 0 | mph |
| Wind Speed - low | 0 | mph |
| Relative Humidity | 63 | % |
| Air Temp | 44 | ° F. |
| Barometric Pressure | 1024 | mbar |

A gas analyzer provided by Snap-On Equipment of Conway, Ark. (Model No. EEEA305A) was used to measure hydrocarbon (HC), carbon dioxide ($CO_2$), carbon monoxide (CO), oxygen ($O_2$), nitrogen oxides ($NO_x$), and air-to-fuel ratio (A/F). A GPS meter provided by II Morrow (Model No. 430-0265-41) was used to measure a speed in miles per hour (MPH) of the marine vessel. The collected data are presented in the tables below.

| | RPM | | | | |
| --- | --- | --- | --- | --- | --- |
| | 650 Neutral | 650 Load | 1000 Load | 1500 Load | 2000 Load |
| HC ppm | 91 | 30 | 11 | 14 | 15 |
| $CO_2$ % | 14.36 | 14.52 | 14.42 | 14.78 | 14.84 |
| $O_2$ % | 0.17 | 0.04 | 0 | 0.03 | 0.01 |
| CO % | 0.055 | 0.02 | 0.197 | 0.255 | 0.132 |

-continued

| | \multicolumn{5}{c}{RPM} |
|---|---|---|---|---|---|
| | 650 Neutral | 650 Load | 1000 Load | 1500 Load | 2000 Load |
| A/F | 15.33 | 15.3 | 15.2 | 15.2 | 15.24 |
| $NO_x$ ppm | 11 | 22 | 15 | 17 | 31 |
| MPH | 0 | 7 | 8 | 13 | 24 |

| | \multicolumn{5}{c}{RPM} |
|---|---|---|---|---|---|
| | 2500 Load | 3000 Load | 3500 Load | 4000 Load | 4500 Load |
| HC ppm | 23 | 44 | 47 | 82 | 81 |
| $CO_2$ % | 14.82 | 14.52 | 14.33 | 13.41 | 13.11 |
| $O_2$ % | 0.02 | 0 | 0.03 | 0.02 | 0.02 |
| CO % | 0.202 | 0.357 | 0.698 | 2.042 | 2.886 |
| A/F | 15.21 | 15.12 | 14.99 | 14.39 | 14.07 |
| $NO_x$ ppm | 47 | 134 | 138 | 474 | 358 |
| MPH | 32 | 38 | 43 | 50 | 57 |

From the foregoing, it will be appreciated that specific embodiments of the disclosure have been described herein for purposes of illustration, but that various modifications may be made without deviating from the spirit and scope of the disclosure. For example, in certain embodiments, several embodiments of the catalytic reactors shown in FIGS. 1-7 may not include the cooling channel for automotive and/or other suitable uses. Accordingly, the disclosure is not limited except as by the appended claims.

We claim:

1. A catalytic converter for treating a flow of exhaust gas, comprising:
 a reaction chamber having a first end section through which the exhaust gas flows into the reaction chamber and a second end section from which the exhaust gas exits the reaction chamber;
 a heating enclosure enclosing at least a portion of the reaction chamber, the heating enclosure being configured to receive a portion of the exhaust gas defining a heated gas, recirculate the heated gas along the exterior of the reaction chamber, and reintroduce the heated gas back into the exhaust as proximate to the first end section; and
 a catalytic element in the reaction chamber.

2. The catalytic converter of claim 1 further comprising a port between the reaction chamber and the heating enclosure through which heated gas flows into and out of the heating chamber.

3. A catalytic converter for treating a flow of exhaust gas, comprising:
 a reaction chamber having a first end section through which the exhaust gas flows into the reaction chamber and a second end section from which the exhaust gas exits the reaction chamber;
 a heating enclosure enclosing at least a portion of the reaction chamber, the heating enclosure being configured to contain and recirculate a heated gas along the exterior of the reaction chamber;
 a catalytic element in the reaction chamber; and
 a coolant channel encasing the heating enclosure, the coolant channel being configured to contain a flow of coolant around the heating enclosure.

4. The catalytic converter of claim 3 wherein:
 the reaction chamber has a central conduit between the first end section and the second end section;
 the heating enclosure has an inner housing having a first portion attached to the first end section of the reaction chamber, a second portion attached to the second end section of the reaction chamber, and a medial portion spaced outwardly apart from the central conduit such that the heating enclosure comprises an enclosed space between the central conduit and the inner housing; and
 the coolant channel has an outer housing spaced outwardly apart from the inner housing and a flow channel defined by the inner housing and the outer housing.

5. The catalytic converter of claim 3 wherein:
 the reaction chamber has a central conduit between the first end section and the second end section, the first end section has a diverging wall with an increasing cross-sectional dimension toward the central conduit, the second end section has a converging wall with a decreasing cross-sectional dimension away from the central conduit, a first port through the converging wall, and a second port through the diverging wall;
 the heating enclosure has an inner housing having a first portion attached to the first end section of the reaction chamber upstream from the second port, a second portion attached to the second end section of the reaction chamber downstream from the first port, and a medial portion spaced outwardly apart from the central conduit such that the heating enclosure comprises an enclosed space between the central conduit and the inner housing; and
 the coolant channel has an outer housing spaced apart from an exterior surface of the inner housing and a flow channel defined by the inner housing and the outer housing.

6. The catalytic converter of claim 3 wherein:
 the reaction chamber has a central conduit between the first end section and the second end section, the first end section has a diverging wall with an increasing cross-sectional dimension toward the central conduit and a first collar extending from the diverging wall, the second end section has a converging wall with a decreasing cross-sectional dimension away from the central conduit and a second collar extending from the converging wall, wherein the first collar has a first port, and wherein the second collar has a second port;
 the heating enclosure has an inner housing having a first portion attached to the first end section of the reaction chamber upstream from the second port, a second portion attached to the second end section of the reaction chamber downstream from the first port, and a medial portion spaced outwardly apart from the central conduit such that the heating enclosure comprises an enclosed space between the central conduit and the inner housing; and
 the coolant channel has an outer housing spaced apart from an exterior surface of the inner housing and a flow channel defined by the inner housing and the outer housing.

7. The catalytic converter of claim 3 wherein the coolant channel further comprises a helical flow guide between the inner housing and the outer housing such that the flow channel extends helically around an outer surface of the inner housing.

8. A catalytic converter for treating a flow of exhaust gas, comprising:

a reaction chamber having an inlet section and an outlet section, wherein a primary flow of the exhaust gas passes through the reaction chamber from the inlet section to the outlet section;

a plenum surrounding the reaction chamber;

a first passageway between the reaction chamber and the plenum at the outlet section and a second passageway between the reaction chamber and the plenum at the inlet section, wherein the first passageway is configured to direct a portion of the primary flow of the exhaust gas through the plenum from the first peg passageway to the second passageway to generate a counter-flow of heated gas through the plenum, and the second passageway is configured to reintroduce the counter-flow of heated gas back into the primary flow of exhaust gas; and a catalytic core in the reaction chamber.

9. The catalytic converter of claim 8 wherein:

the reaction chamber has a conduit between the inlet section and the outlet section;

the plenum has an intermediate wall spaced outwardly apart from the conduit such that the plenum comprises an enclosed space between the inner wall and the conduit; and wherein the catalytic converter further includes a coolant channel surrounding the plenum, and wherein the coolant channel has an outer wall spaced apart from the intermediate wall such that the coolant channel comprises a flow channel between the intermediate wall and the outer wall.

10. The catalytic converter of claim 9 wherein the coolant channel comprises a helical divider between the intermediate wall and the outer wall such that the coolant channel extends helically around an outer surface of the intermediate wall.

11. The catalytic converter of claim 8 wherein the inlet section has an increasing cross-sectional dimension creating an expansion zone upstream from the catalytic core relative to a primary flow through the catalytic core and the outlet section has a decreasing cross-sectional dimension creating a high-pressure zone downstream from the catalytic core relative to the primary flow.

12. The catalytic converter of claim 11 wherein the first passageway is an aperture through the outlet section, the second passageway is an aperture through the inlet section, and the catalytic converter further comprises a first flap at the first passageway and a second flap at the second passageway, and wherein the first and second flaps project into the plenum.

13. A method for reducing emissions from a flow of exhaust gas, comprising:

passing a primary flow of exhaust gas in a first direction through a catalytic core in a reaction chamber;

passing a secondary flow of exhaust gas through a heating enclosure around the reaction chamber; and passing a flow of cooling fluid through a coolant channel surrounding the heating enclosure.

14. The method of claim 13, further comprising extracting the secondary flow of exhaust gas from the primary flow of exhaust gas after the primary flow of exhaust gas has passed through the catalytic core and directing the secondary flow of exhaust gas through the heating enclosure.

15. The method of claim 14, further comprising directing the secondary flow of exhaust gas through the heating enclosure in a second direction opposite the first direction of the primary flow of exhaust gas and introducing the secondary flow of exhaust gas back into the primary flow of exhaust gas upstream of the catalytic core relative to the primary flow of exhaust gas.

16. The method of claim 13, further comprising passing the flow of cooling fluid along a helical path around the heating enclosure.

17. The method of claim 13, further comprising:

extracting the secondary flow of exhaust gas from the primary flow of exhaust gas after the primary flow of exhaust gas has passed through the catalytic core;

directing the secondary flow of exhaust gas through the heating enclosure in a second direction opposite the first direction of the primary flow of exhaust gas;

introducing the secondary flow of exhaust gas back into the primary flow of exhaust gas upstream of the catalytic core relative to the primary flow of exhaust gas; and passing the flow of cooling fluid along a helical path around the heating compartment.

* * * * *